US006203725B1

(12) United States Patent
Ogiso et al.

(10) Patent No.: US 6,203,725 B1
(45) **Date of Patent: *Mar. 20, 2001**

(54) LUMINESCENT COMPOUND FOR CONTROLLING TRAVELING AND METHOD FOR CONTROLLING TRAVELING USING THE SAME

(75) Inventors: Akira Ogiso, Fukuoka; Yasuhisa Fujii, Aichi; Kyozo Kurita, Aichi; Masataka Iwata, Aichi; Shizuo Kuroda; Hisato Itoh, both of Fukuoka, all of (JP)

(73) Assignee: Mitsui Chemicals, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,152

(22) Filed: Jul. 18, 1997

(30) Foreign Application Priority Data

Jul. 24, 1996 (JP) ..... 8-194734
Aug. 1, 1996 (JP) ..... 8-203739

(51) Int. Cl.$^7$ ..... C09K 11/00; B62D 1/28

(52) U.S. Cl. ..... 252/301.35; 701/23; 180/168; 180/167; 180/169; 428/690; 428/691; 252/301.16; 252/301.4 R

(58) Field of Search ..... 252/301.16, 301.35, 252/301.4 R; 106/31.15, 31.32, 31.64; 428/690, 691; 180/167, 168, 169; 701/23

(56) References Cited

U.S. PATENT DOCUMENTS 3,066,105 * 11/1962 McCafferty ..... 252/301.35
3,935,922 2/1976 Cooper et al. ..... 180/168
3,960,755 * 6/1976 Beachem et al. ..... 252/301.16
4,015,131 * 3/1977 McDonough et al. ..... 252/301.35
4,307,791 12/1981 De Bruine ..... 180/168
4,443,380 4/1984 Yamazoe et al. ..... 260/429.2
4,707,297 * 11/1987 Paske, Jr. et al. ..... 252/301.16
5,084,205 * 1/1992 Auslander ..... 252/301.35
5,158,703 * 10/1992 Takuma et al. ..... 252/301.35
5,277,839 * 1/1994 Schultz ..... 252/301.16
5,277,840 * 1/1994 Osaka et al. ..... 252/301.35
5,442,021 8/1995 Heliger ..... 526/241
5,622,236 * 4/1997 Azumi et al. ..... 180/168

FOREIGN PATENT DOCUMENTS 57-155610 9/1982 (JP) .
60-31620 2/1985 (JP) .
3-228105 10/1991 (JP) .
5-150827 6/1993 (JP) .
6-149350 5/1994 (JP) .
8-022322 1/1996 (JP) .

OTHER PUBLICATIONS

Leverenz, "Phosphors Versus Periodic System", Proceedings of the I.R.E., pp. 260–261, May 1994.*

Patent Abstracts Of Japan, vol.12, No. 275, (C–516), Jul. 29, 1988 & JP 63 054465A (Asahi Chem. Ind. Co. Ltd.), Mar. 8, 1988 (Abstract Only).

Patent Abstracts Of Japan, vol. 95, No. 11, Dec. 26, 1995 & JP 07 200057 A (Toho Technol KK) Aug. 4, 1995 (Abstract Only).

* cited by examiner

*Primary Examiner*—C. Melissa Koslow
(74) *Attorney, Agent, or Firm*—Burns, Doane, Swecker, & Mathis, L.L.P.

(57) ABSTRACT

According to the present invention, when the traveling of an automatic guided vehicle is optically controlled, a traveling controlling means containing a luminescent compound satisfying the following formula (1) is placed in a predetermined range for traveling of the automatic guided vehicle:

$$A-B \geqq 150 \text{ nm} \quad (1)$$

wherein, A represents the minimum wavelength end (nm) of the luminescent compound, and B represents the maximum wavelength end (nm) of an irradiation light used for the traveling controlling.

12 Claims, No Drawings

LUMINESCENT COMPOUND FOR CONTROLLING TRAVELING AND METHOD FOR CONTROLLING TRAVELING USING THE SAME

BACKGROUND OF THE INVENTION

1. Field of the Invention

The present invention relates to a luminescent dye compound used for a method for controlling traveling of a traveling articles including automatic guided vehicles such as an industrial robot, and a laminated article for detection and an ink composition for detection used for the method 2. Description of the Related Art As a method for controlling traveling of an architectural robot, a method has been suggested in which a guidepath is embedded under a road surface, and a current is applied to generate a magnetic field for controlling (Japanese Patent Application Laid-Open (JP-A) No. 60(1985) -31620). However, this method cannot be applied for floors of an office or a department store in which various variations in layout are required since the embedding cost is high, and since, as the most important problem, it is very difficult to change a track. On the other hand, as a guiding method in which the guidepath is not installed on the floor, there is known a method for traveling control in which a laser beam, ultrasonic wave or light emitting diode beam is applied toward a wall, a reflected wave from the wall is detected and a traveling machine moves with keeping a constant distance from the wall (Japanese Patent Application Laid-Open (JP-A) Nos. 57(1982)-155610, 3(1991)-228105). However, there are troubles in this method that when a wall has unevenness, a reflected wave cannot be detected due to scattering and an automatic guided vehicle collides with the wall, and further, when an obstacle is placed between a wall and the automatic guided vehicle, a reflected wave generated by collision of an irradiation wave with the obstacle is mistook for a reflected wave from the wall, and the automatic guided vehicle deviates from the track and cannot travel along the wall. Further, there has been suggested a guiding system in which an infrared ray source is installed on the ceiling, an infrared ray is transmitted toward a floor surface, and an automatic guided vehicle is guided by this infrared ray (Japanese Patent Application Laid-Open (JP-A) No. 5(1993)-150827). However, this system has problems that when an infrared ray is disturbed by an obstacle, it cannot function at all, as well as the apparatus and installing procedure thereof need high cost.

Recently, to solve the above-described problem, there has been suggested an automatic guided vehicle guiding system in which a guide line is drawn on a floor surface with a material containing a luminescent dye as a main component, and the traveling of the automatic guided vehicle is controlled with detecting a light emitted from the luminescent dye by a photosensor installed on the automatic guided vehicle (Japanese Patent Application Laid-Open (JP-A) Nos. 6(1994)-149350 and 8(1996)-22322).

In these methods, a luminescent dye which is exciting and emits a light by absorbing an ultraviolet ray, visible light or infrared ray is installed on a guidepath, and the resulting emitted light is detected by a photosensor installed on an automatic guided vehicle for conducting automatic guide, and the characteristic thereof is that the guidepath can be installed inexpensively without requiring a special construction.

The present inventors have found during the investigation of automatic controlled traveling that when automatic traveling control is conducted by a known method (Japanese Patent Application Laid-Open (JP-A) No. 6(1994)-149350), a lot of malfunctions occur and the method is practically problematical.

The present inventors have intensively studied a cause which brings about malfunction, and consequently, have found that there are two causes as a cause which brings about malfunction, as described below:

(1) Sufficient emission strength cannot be obtained and therefore detection is impossible.

(2) An irradiation light is reflected from floor, wall or scattered and therefore a photo-detecting apparatus malfunctions.

SUMMARY OF THE INVENTION

An object of the present invention is to provide a luminescent compound for controlling traveling which manifests sufficient emission strength for the optical control of traveling articles such as an automatic guided vehicle to realize stable traveling without malfunction.

Another object of the present invention is to provide a resin composition for detection, a molded resin for detection and an ink composition for detection containing the above-described luminescent compound for controlling traveling.

Further, the present invention provide a method for optically controlling traveling articles such as an automatic guided vehicle.

The present inventors have intensively studied in consideration of these problems, and as a result, found that stable traveling without malfunction can be realized by selecting a luminescent compound for controlling traveling, wherein the minimum wavelength end (A nm) of the luminescent compound used for optically controlling traveling and the maximum wavelength end (B nm) of an irradiation light used for controlling traveling satisfy the following relation:

$$A-B \geqq 150 \text{ nm} \quad (1).$$

completing the present invention. In the present invention, the term "the minimum wavelength end" means the minimum wavelength in the wavelength region of a luminescence spectrum having the maximum luminescent intensity, and the term "the maximum wavelength end" means the maximum wavelength in the wavelength region of an irradiation light spectrum.

The traveling controlling which is the object of the present invention can be carried out by applying the compound having the aforesaid characteristics or installing a resin film containing the compound on the floor or wall in which an automatic guided vehicle such as a robot are moved.

DETAILED DESCRIPTION OF THE PREFERRED EMBODIMENTS

Namely, the present invention includes the following aspects.

(i) A luminescent compound used for optically controlling a traveling article, wherein the minimum wavelength end (A nm) of the luminescent compound used for controlling traveling and the maximum wavelength end (B nm) of an irradiation light used for controlling traveling satisfy the following relation:

$$A-B \geqq 150 \text{ nm} \quad (1).$$

(ii) A luminescent compound for controlling traveling, wherein the luminescent compound for controlling traveling of (i) is a compound represented by the following general formula (2):

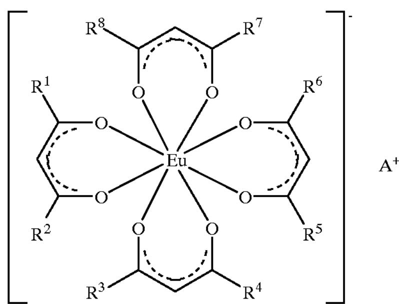

wherein, $R^1$, $R^2$, $R^3$, $R^4$, $R^5$, $R^6$, $R^7$ and $R^8$ are each independently represent a substituted or unsubstituted alkyl group, a substituted or unsubstituted aryl group or a substituted or unsubstituted heteroaryl group, and $A^+$ represents a quaternary ammonium ion or phosphonium ion.

(iii) A resin composition for detection which comprises the luminescent compound for controlling traveling of paragraph (i) and a resin.

(iv) A molded resin material for detection which is obtained by molding the resin composition of paragraph (iii).

(v) The resin composition for detection of paragraph (iii) and the molded resin of paragraph (iv) in which the resin is selected from polyethylene, polypropylene, polyethylene terephthalate, polymethyl acrylate, polymethyl methacrylate or a copolymer thereof.

(vi) The resin composition for detection of paragraph (iii) and the molded resin of paragraph (iv), in which the luminescent compound for controlling traveling of (i) is a compound represented by the aforementioned formula (2).

(vii) The resin composition for detection of paragraph (iii) and the molded resin of paragraph (iv), wherein the amount added of the compound of paragraph (i) is from 0.01% by weight to 10% by weight based on the molded resin.

(viii) The molded resin material for detection of paragraph (iv) in which the thickness of the material is from 10 to 500 $\mu$m.

(ix) The molded resin material for detection of paragraphs (iv) and (viii) in which the material has an adhesive layer.

(x) A laminated article for detection obtained by applying on a resin film an adhesive containing the luminescent compound for controlling traveling of paragraph (i).

(xi) The laminated article for detection of paragraph (x), wherein the resin film is selected from polyethylene, polypropylene, polyvinyl chloride, polyvinylidene chloride, polystyrene, polyethylene terephthalate, polycarbonate, polymethyl acrylate, polymethyl methacrylate, polyether ether ketone and polyether sulfone.

(xii) The laminated article for detection of paragraph (x) in which the thickness of the resin film is from 5 to 500 $\mu$m.

(xiii) The laminated article for detection of paragraph (x) in which the luminescent compound for controlling traveling is a compound represented by the aforementioned formula (2).

(xiv) The laminated article for detection of paragraph (x) which contains the compound of paragraph (i) in an amount from 0.01% by weight to 10% by weight based on the adhesive.

(xv) The laminated article for detection of paragraph (x) in which the adhesive is an acrylic adhesive.

(xvi) An ink composition for detection which comprises the above-described luminescent compound for controlling traveling of paragraph (i), a solvent and a binder.

(xvii) The ink composition for detection of paragraph (xvi), wherein the binder is polymethyl methacrylate, polymethyl acrylate or a copolymer resin of methyl methacrylate with methyl acrylate.

(xviii) The ink composition for detection of paragraph (xvi), in which the luminescent compound for controlling traveling is a compound represented by the aforementioned formula (2).

(xix) The ink composition for detection of paragraph (xvi), which contains the above-described luminescent compound of paragraph (i) for controlling traveling in an amount from 0.001% by weight to 10% by weight based on the ink composition.

(xx) A method for optically controlling a traveling article, wherein a traveling controlling means containing a luminescent compound which satisfies the following formula (1) is placed on a predetermined region for moving the traveling article:

$$A-B \geqq 150 \text{ nm} \qquad (1).$$

wherein, A represents the minimum wavelength end (nm) of the luminescent compound and B represents the maximum wavelength end (nm) of an irradiation light used for controlling traveling.

(xxi) The method for controlling traveling of (xx), wherein the luminescent compound for controlling traveling is the compound represented by the above-described general formula (2).

The luminescent compound for controlling traveling of the present invention is a luminescent compound, wherein the minimum wavelength end (A nm) of the luminescent compound used for controlling traveling and the maximum wavelength end (B nm) of an irradiation light used for controlling traveling satisfy the following relation:

$$A-B \geqq 150 \text{ nm} \qquad (1).$$

Further, a resin composition for detection comprising the above-described compound and a resin, a molded resin for detection obtained by molding the composition, or a laminated article for detection obtained by applying on a resin film an adhesive containing the above-described luminescent dye compound are prepared, the molded article is placed on a wall, road, a light emitted from an irradiation apparatus is used as an exciting energy, the emitted light resulting from the exciting is detected by a detecting apparatus for controlling a traveling article such as an automatic guided vehicle.

Also, an ink composition for detection comprising at least one of the above-described luminescent compounds, a solvent and a binder resin is prepared, a material such as fiber sheets, nonwoven fabric, resin plate, concrete plate, silicon coated plate on which the ink composition is applied is placed, a light emitted from an irradiation apparatus is used as an exciting energy, the emitted light resulting from the exciting is detected by a detecting apparatus for controlling a traveling article such as an automatic guided vehicle.

The luminescent compound for controlling traveling of the present invention is a compound which satisfies the following condition:

Namely, it is a luminescent compound in which the minimum wavelength end (A nm) of the luminescent compound used for controlling traveling and the maximum wavelength end (B nm) of an irradiation light used for controlling traveling satisfy the following relation:

$$A-B \geqq 150 \text{ nm} \quad (1).$$

Here, A is defined as a wavelength (unit: nm) representing the minimum wavelength in the wavelength region of a luminescence spectrum having the maximum luminescent intensity. More specifically, it is defined as a wavelength which has (1) a strength which is one-twentieth of the maximum luminescence energy strength on the shorter wavelength side in the wavelength region of a luminescence spectrum having the maximum luminescent intensity.

B is defined as a wavelength (unit: nm) representing maximum wavelength in the wavelength region of an irradiation light spectrum. More specifically, it is defined as a wavelength which has (1) a strength which is one-fifth of the maximum irradiation light energy strength on the longer wavelength side in an irradiation light spectrum obtained by an irradiation apparatus.

The above-described formula (1) of the present invention shows that the difference between the minimum wavelength end A in the wavelength region of a luminescence spectrum having the maximum luminescent intensity and the maximum wavelength end B in the wavelength region of an irradiation light spectrum is not less than 150 nm, and there occurs no malfunction in a photo-detecting apparatus due to a reflected light from a floor or wall of an irradiation light, or a scattered light, and consequently, excellent controlling can be conducted.

As an important condition for practicing the traveling controlling of the present invention, it is necessary to impart an effective exciting energy sufficient for detection by using an effective irradiation light energy to give a detectable emitted energy. In other word, it is necessary that an effective wavelength range of an irradiation light spectrum overlaps fully with an effective wavelength range of an exciting spectrum of a luminescent compound.

Here, the effective wavelength range of an irradiation light spectrum is defined as a range from the minimum wavelength end b to the maximum wavelength end B in the wave length range of an irradiation light spectrum. Definition b is defined as a wavelength showing the minimum wavelength end in the wavelength range of an irradiation light spectrum. More specifically, it is defined as a wavelength which has (1) a strength which is one-fifth of the maximum irradiation light energy strength on the shorter wavelength side in an irradiation light spectrum obtained by an irradiation apparatus.

Then, the effective wavelength range of an exciting spectrum of the present invention is defined as a range from the minimum wavelength end q to the maximum wavelength end Q in a wave length range of an exciting spectrum.

Here, definition q is defined as a wavelength showing the minimum wavelength end in the wavelength range of an exciting spectrum having the maximum exciting strength. More specifically, it is defined as a wavelength which has (1) a strength which is one-fifth of the maximum exciting energy strength on the shorter wavelength side in the wavelength range of an exciting spectrum having the maximum exciting strength.

Further, definition Q is defined as a wavelength showing the maximum wavelength end in the wavelength range of an exciting spectrum having the maximum exciting strength. More specifically, it is defined as a wavelength which has (1) a strength which is one-fifth of the maximum exciting energy strength on the longer wavelength side in the wavelength range of an exciting spectrum having the maximum exciting strength.

Namely, as a practical condition for the full overlap of the effective wavelength range of an irradiation light spectrum with the effective wavelength range of an exciting spectrum of a luminescent dye, it is necessary to satisfy the following both relations (3) and (4);

$$B>q \quad (3)$$

$$b<Q \quad (4), \text{ and}$$

the energy of the irradiation light gives an exciting energy required for detection according to the present condition, and as a result, an emission required for detection can be obtained.

The irradiation apparatus used in the present invention is an apparatus capable of giving an irradiation light of the above-determined spectrum wavelength range. Examples of light sources which can be used to give an irradiation light include continuous spectrum light sources such as a hydrogen lamp, deuterium lamp, xenon lamp, halogen lamp, line spectrum light sources such as a mercury lamp, mercury-xenon lamp, pulse light sources such as a xenon flash lamp, and light emitting diode. Also, it may be permitted that an electromagnetic wave absorption filter such as a commercially available ultraviolet ray absorption filter or a visible light absorption filter is used near an irradiation light source, transmission of an irradiation light at the wavelength end is suppressed and light strength is lowered to make the wavelength end.

As the light detecting apparatus, a photo multiplier such as a photo transistor is usually used.

As the luminescent compound for controlling traveling of the present invention, there is preferably listed a dye having no absorption in a visible ray range from 400 to 700 nm. The dye of the present invention may be used alone or in combination.

Further, it is preferable to use a luminescent compound for controlling traveling in which the minimum wavelength end b in the effective wavelength range of an irradiation light spectrum is defined by the inequality 300 nm $\leqq$b $\leqq$400 nm, and the minimum wavelength end A in an emission spectrum is defined by the inequality 550 nm $\leqq$A $\leqq$700 nm.

Moreover, as an example of a luminescent compound which satisfies the above-described condition, the compound represented by the above-described formula (2) is listed, and it has become possible to realize excellent traveling controlling without malfunction by using a resin composition for detection comprising the above-described compound and a resin, a molded resin material for detection obtained by mixing and molding the above described resin composition, a laminated article for detection obtained by mixing the above-described compound with an adhesive and applying the resulting mixture on a resin film, and an ink composition for detection containing the above-described compound, for controlling traveling.

In the present invention, as a resin used for the resin composition for detection, a clear thermoplastic resin which is transparent and has a melting point of not more than 350° C. is preferred. From the view point of durability, more preferable examples thereof include polyethylene, polypropylene, polyethylene terephthalate, polymethyl acrylate, and polymethyl methacrylate.

The resin composition for detection of the present invention optionally may appropriately contain a hindered phenol-based antioxidant or a hindered amine-based antioxidant which is a fastness improving agent, a benzotriazol-based light-fastness improving agent, a benzophenone-based light-fastness improving agent and a complex-based light-fastness improving agent.

It is preferable that the resin composition for detection of the present invention contains the luminescent compound for controlling traveling of the present invention in an amount from 0.01% by weight to 10% by weight based on the resin composition.

The resin composition for detection of the present invention is obtained by a method in which the above-described resin composition is mixed in the form of a powder, then molten with heating at a temperature from 200 to 350° C. by a mixing machine, and poured into a mold, or a method in which the above-described resin composition is drawn on a roll to make a raw film, then the plate is stretched at a magnification from 3 to 10-fold by a stretching machine to make a film. Also, the resin composition for detection of the present invention may be a molded article which is obtained by spinning the above-described composition and processing the resulting thread into textile or non-woven fabric.

Further, the laminated article for detection of the present invention may be one which is obtained by applying an adhesive containing the luminescent compound for controlling traveling of the present invention on a resin film. The content of the luminescent compound for controlling traveling of the present invention is desirably from 0.01% by weight to 10% by weight based on the total weight of the adhesive.

In the present invention, as a resin used in the laminated article for detection, there are listed thermoplastic resins which are transparent and have a melting point of not more than 350° C. Preferable example thereof include polyethylene, polypropylene, polyvinyl chloride, polyvinylidene chloride, polystyrene, polyethylene terephthalate, polycarbonate, polymethyl acrylate, polymethyl methacrylate, polyether ether ketone and polyether sulfone.

As a method for obtaining the laminated article for detection of the present invention, there is listed a method in which the luminescent compound for controlling traveling of the present invention is mixed with an adhesive or a solution of an adhesive, the resulting mixture is applied on a resin film at a thickness of 5 to 500 $\mu$m by a coating machine, and the applied layer is dried.

As a method for producing a resin film used for the laminated article for detection of the present invention, a method in which a resin is molten with heating, and made into a film by an extruder, or a raw film extruded by an extruder is stretched at a magnification of 2 to 10-fold to obtain a resin film, are listed.

Further, a hindered phenol-based antioxidant or a hindered amine-based antioxidant which is a fastness improving agent for a resin, a benzotriazol-based light-fastness improving agent, a benzophenone-based light-fastness improving agent and a complex-based light-fastness improving agent may optionally be added appropriately to the composition or molded article of the present invention.

As an adhesive used in the present invention, general-purpose products such as an acrylic adhesive, urethane-based adhesive are listed. Further, as a curing agent, there may be used compounds which are easily available in general such as a melamine-based curing agent, aluminum chelate-type curing agent.

The ink composition for detection of the present invention is an ink composition for detection obtained by mixing at least one luminescent compound for controlling traveling of the present invention with a solvent and a binder resin.

When traveling controlling is conducted using the ink composition for detection of the present invention, the ink composition is previously applied on a material including fiber sheets such as a carpet and cloth, resin plate, concrete plate, silicon coated plate, and the material applied with the composition is installed at a predetermined place, or the composition can be applied on said material which has been previously installed at a predetermined place, to achieve the object.

Alternatively, a resin is molten with heating, spun and made into a molded article such as textile or non-woven fabric, the ink composition of the present invention is applied on the molded article and dried to form a luminescent layer, the resulting molded article carrying the luminescent layer is installed at a predetermined place to achieve the object.

Examples of a solvent for preparing the ink composition of the present invention include alcohol such as methanol, ethanol, propanol, isopropanol, methyl cellosolve, ethyl cellosolve, diethylene glycol monomethyl ether, diethylene glycol monoethyl ether; ketones such as acetone, methyl ethyl ketone, methyl isobutyl ketone; esters such as methyl acetate, ethyl acetate, butyl acetate; ethers such as diethyl ether, dibutyl ether, tetrahydrofuran; amides such as N,N-dimethylformamide; aromatic hydrocarbons such as toluene, benzene, xylene; nitriles such as acetonitrile, benzonitrile and the like; halides such as chloroform, dichloroethane;. Further, examples of the binder resin include polymethyl methacrylate, polymethyl acrylate, polyethyl acrylate, polybutyl acrylate, polystyrene, polyacrylonitrile and copolymers thereof.

In the ink composition for detection of the present invention, the concentration of the luminescent compound for controlling traveling of the present invention in the ink may be within a limit in which the compound can be dissolved in a solvent or a binder, and usually, is from 0.001 to 10% by weight, preferably from 0.01 to 1% by weight based on the ink composition.

In the ink composition for detection of the present invention, the amount used of the binder in the ink is usually from 0.01 to 50% by weight, preferably from 0.1 to 10% by weight based on the ink composition.

When the ink composition for detection of the present invention is produced, a hindered phenol-based antioxidant or a hindered amine-based antioxidant which is a fastness improving agent for a resin, a benzotriazol-based light-fastness improving agent, a benzophenone-based light-fastness improving agent and a complex-based light-fastness improving agent may optionally be added appropriately to the composition.

A coating agent such as a wax or varnish which retains the function of the luminescent compound of the present invention and which imparts waterproof and abrasion resistance can be applied to make a upper layer on a place on which the resin molded article or laminated article for detection of the present invention is installed or a place on which the ink composition for detection is applied and dried.

The compound represented by formula (2) exemplified as the luminescent compound for controlling traveling of the present invention will be described below. In formula (2), examples of the substituted or unsubstituted alkyl group represented by $R^1$ to $R^8$ include linear, branched or cyclic hydrocarbons having 1 to 10 carbon atoms such as a methyl group, ethyl group, n-propyl group, isopropyl group, n-butyl group, isobutyl group, sec-butyl group, n-pentyl group, 1-methylbutyl group, 2-methylbutyl group, 3-methylbutyl group, 1,1-dimethylbutyl group, 1,2-dimethylbutyl group, 2,2-dimethylbutyl group, 1-ethylpropyl group, 2-ethylpropyl group, n-hexyl group, cyclohexyl group, n-heptyl group, methylcyclohexyl group, n-octyl group, 2-ethylhexyl group, ethylcyclohexyl groups, dimethylcyclohexyl groups, n-nonyl group, 3,5,5-trimethylhexyl group, and n-decyl group; aralkyl groups such as a benzyl group, phenethyl group, tolylmethyl group, methoxybenzyl group, naphthylmethyl group, and naphthylethyl group;

linear, branched or cyclic halogenated hydrocarbons having 1 to 10 carbon atoms and 1 to 21 halogen atoms such as a fluoromethyl group, difluoromethyl group, trifluoromethyl group, chloromethyl group, dichloromethyl group, trichloromethyl group, bromomethyl group, dibromomethyl group, tribromomethyl group, iodomethyl group, fluoroethyl group, difluoroethyl group, trifluoroethyl group, tetrafluoroethyl group, heptafluoropropyl group, chloroethyl group, dichloroethyl group, trichloroethyl group, tetrachloroethyl group, heptachloropropyl group, hexafluoroisopropyl group, and trifluoromethylcyclohexyl group;

linear, branched or cyclic alkoxyalkyl groups having 2 to 10 carbon atoms such as a methoxymethyl group, ethoxymethyl group, methoxyethyl group, ethoxyethyl group, n-propoxyethyl group, isopropoxyethyl group, n-butoxyethyl group, isobutoxyethyl group, tert-butoxyethyl group, n-hexyloxylethyl group, cyclohexyloxyethyl group, 2-methoxypropyl group, methoxyisopropyl group, 2-ethoxypropyl group, ethoxyisoproyl group, 2-propoxypropyl group, propoxyisopropyl group, methoxyethoxyethyl group, and ethoxyethoxyethyl group;

linear, branched or cyclic alkylthioalkyl groups having 2 to 10 carbon atoms such as a methylthiomethyl group, ethylthiomethyl group, methylthioethyl group, ethylthioethyl group, n-propylthioethyl group, isopropylthioethyl group, n-butylthioethyl group, isobutylthioethyl group, tert-butylthioethyl group, n-hexylthioethyl group, cyclohexylthioethyl group, 2-methylthiopropyl group, methylthioisopropyl group, 2-ethylthiopropyl group, ethylthioisopropyl group, 2-propylthiopropyl group, propylthioisopropyl group, methylthioethoxyethyl group, and ethylthioethylthioethyl group;

linear, branched or cyclic N-alkylaminoalkyl groups having 2 to 10 carbon atoms and N,N-dialkylaminoalkyl groups having 3 to 20 carbon atoms such as a N-methyl-aminomethyl group, N-methylaminoethyl group, N-ethylaminomethyl group, N-ethylaminoethyl group, N,N-dimethylaminomethyl group, N,N-diethylaminomethyl group, N,N-dimethylaminoethyl group, and N,N-diethylaminoethyl group.

Examples of the substituted or unsubstituted aryl group include unsubstituted aryl groups such as a phenyl group, naphthyl group, anthranyl group;

substituted aryl groups substituted by linear, branched or cyclic groups having 1 to 10 carbon atoms such as 2-methylphenyl group, 3-methylphenyl group, 4-methylphenyl group, 2,3-dimethylphenyl group, 2,4-dimethylphenyl group, 2,5-dimethylphenyl group, 2,6-dimethylphenyl group, 3,4-dimethylphenyl group, 3,5-dimethylphenyl group, 3,6-dimethylphenyl group, 2,3,4-trimethylphenyl group, 2,3,5-trimethylphenyl group, 2,3,6-trimethylphenyl group, 2,4,5-trimethylphenyl group, 2,4,6-trimethylphenyl group, 3,4,5-trimethylphenyl group, 2-ethylphenyl group, propylphenyl group, butylphenyl group, hexylphenyl group, cyclohexylphenyl group, octylphenyl group, 2-methyl-1-naphthyl group, 3-methyl-1-naphthyl group, 4-methyl-1-nahthyl group, 5-methyl-1-naphthyl group, 6-methyl-1-naphthyl group, 7-methyl-1-naphthyl group, 8-methyl-1-naphthyl group, 1-methyl-2-naphtyl group, 3-methyl-2-naphtyl group, 4-methyl-2-naphthyl group, 5-methyl-2-naphthyl group, 6-methyl-2-naphthyl group, 7-methyl-2-naphthyl group, 8-methyl-2-naphthyl group, and 2-ethyl-1-naphthyl group;

substituted aryl groups substituted by a linear, branched or cyclic alkoxy group having 1 to 10 carbon atoms such as a 3-methoxyphenyl group, 4-methoxyphenyl group, 2,3-dimethoxyphenyl group, 2,4-dimethoxyphenyl group, 2,5-dimethoxyphenyl group, 2,6-dimethoxyphenyl group, 3,4-dimethoxyphenyl group, 3,5-dimethoxyphenyl group, 3,6-dimethoxyphenyl group, 2,3,4-trimethoxyphenyl group, 2,3,5-trimethoxyphenyl group, 2,3,6-trimethoxyphenyl group, 2,4,5-trimethoxyphenyl group, 2,4,6-trimethoxyphenyl group, 3,4,5-trimethoxyphenyl group, 2-ethoxyphenyl group, propoxyphenyl group, butoxyphenyl group, hexyloxyphenyl group, cyclohexyloxyphenyl group, octyloxyphenyl group, 2-methoxy-1-naphthyl group, 3-methoxy-1-naphtyl group, 4-methoxy-1-naphthyl group, 5-methoxy-1-naphthyl group, 6-methoxy-1-naphthyl group, 7-methoxy-1-naphthyl group, 8-methoxy-1-naphthyl group, 1-methoxy-2-naphthyl group, 3-methoxy-2-naphthyl group, 4-methoxy-2-naphtyl group, 5-methoxy-2-naphthyl group, 6-methoxy-2-naphtyl group, 7-methoxy-2-naphtyl group, 8-methoxy-2-naphtyl group, and 2-ethoxy-1-naphthyl group;

groups substituted by halogen such as chlorophenyl group, dichlorophenyl group, trichlorophenyl group, bromophenyl group, dibromophenyl group, iodophenyl group, fluorophenyl group, difluorophenyl group, trifluorophenyl group, tetrafluorophenyl group, and pentafluorophenyl group; groups substituted by a halogenated alkyl group such as a trifluoromethylphenyl group;

N-monosubstituted aminoaryl groups or N,N-disubstituted aminoaryl groups such as N,N-dimethylaminophenyl group, N,N-diethylaminophenyl group, N-phenyl-N-methylaminophenyl group, N-tolyl-N-ethylaminophenyl group, N-chlorophenyl-N-cyclohexylaminophenyl group, and N,N-ditolylaminophenyl group;

alkylthioaryl groups or arylthioaryl groups such as methylthiophneyl group, ethylthiophenyl group, methylthionaphthyl group, and phenylthiophenyl group.

Examples of the substituted or unsubstituted heteroaryl group include furyl group, thienyl group, thianthnyl group, pyranyl group, isobenzofuranyl group, chromenyl group, xanthenyl group, phenoxanthynyl group, 2H-pyrrolyl group, pyrrolyl group, imidazolyl group, pyrazolyl group, isothiazolyl group, thiazolyl group, benzisothiazolyl group, benzothiazolyl group, isoxazolyl group, oxazolyl group, benzisoxazolyl group, benzoxazolyl group, pyridyl group, pyradinyl group, pyrimidynyl group, indolyl group, isoindolyl group, quinonyl group, isoquinonyl group, oxadiazolyl group and thiadiazolyl group; and alkyl substituted groups, aryl substituted groups, alkoxy substituted groups, aryloxy substituted groups, halogen substituted groups, alkoxycarbonyl substituted groups and nitrile substituted groups thereof.

Examples of the quaternary ammonium ion $A^+$ include ammonium ions represented by the following formula (5):

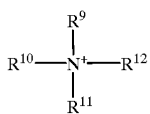

(5)

wherein, $R^9$, $R^{10}$, $R^{11}$ and $R^{12}$ represent a substituted or unsubstituted alkyl group.

Examples of the phosphonium ion include phosphonium ions represented by the following formula (6):

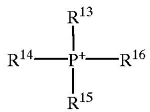

(6)

wherein, $R^{13}$, $R^{14}$, $R^{15}$ and $R^{16}$ represent a substituted or unsubstituted alkyl group.

The luminescent compound represented by the above-described formula (2) is produced by reacting 1 to 4 kinds of β-diketones represented by formula (7):

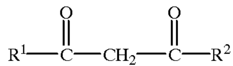

(7)

wherein, $R^1$ and $R^2$ have the same meaning as that of $R^1$ to $R^8$ of formula (2), or tautomers thereof, a europium derivative, a quaternary ammonium salt represented by the following formula (8):

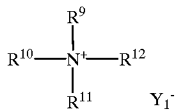

(8)

wherein, $R^9$ to $R^{12}$ have the same meaning as that of $R^9$ to $R^{12}$ of formula (5), and $Y_1^-$ represents a fluorine ion, chlorine ion, bromine ion, iodine ion, hydroxide ion or toluene sulfonic ion, or a phosphonium salt represented by the following formula (9):

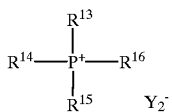

(9)

wherein, $R^{13}$ to $R^{16}$ have the same meaning as that of $R^{13}$ to $R^{16}$ of formula (6), and $Y_2^-$ represents a fluorine ion, chlorine ion, bromine ion, iodine ion, hydroxide ion or toluene sulfonic ion, in alcohol under alkaline condition.

Examples of the europium derivative include europium oxide, europium chloride.

Examples of the substituted or unsubstituted alkyl group represented by $R^9$ to $R^{16}$ in formulas (5), (6), (8) and (9) include linear, branched or cyclic hydrocarbon groups having 1 to 10 carbon atoms such as a methyl group, ethyl group, n-propyl group, isopropyl group, n-butyl group, isobutyl group, sec-butyl group, n-pentyl group, 1-methylbutyl group, 2-methylbutyl group, 3-methylbutyl group, 1,1-dimethylbutyl group, 1,2-dimethylbutyl group, 2,2-dimethyl butyl group, 1-ethylpropyl group, 2-ethylpropyl group, n-hexyl group, cyclohexyl group, n-heptyl group, methylcyclohexyl group, n-octyl group, 2-ethylhexyl group, ethylcyclohexyl group, dimethylcyclohexyl group, n-nonyl group, 3,5,5-trimethylhexyl group, n-decyl group; linear, branched or cyclic alkoxyalkyl groups having 2 to 10 carbon atoms such as a methoxymethyl group, ethoxymethyl group, methoxyethyl group, ethoxyethyl group, n-propoxyethyl group, isopropoxyethyl group, n-butoxyethyl group, isobutoxyethyl group, tert-butoxyethyl group, n-hexyloxylethyl group, cyclohexyloxyethyl group, 2-methoxypropyl group, methoxyisopropyl group, 2-ethoxypropyl group, ethoxyisoproyl group, 2-propoxypropyl group, propoxyisopropyl group, methoxyethoxyethyl group, ethoxyethoxyethyl group; and aralkyl groups such as a benzyl group, phenethyl group, tolylmethyl group, methoxybenzyl group, naphthylmethyl group, naphthylethyl group.

For controlling traveling, there are methods as described below:

(1) A floor surface in a range in which traveling is permitted is covered with the molded resin for detection using the luminescent compound for controlling traveling of the present invention, the laminated article for detection or a material on which the ink composition for detection is applied, or the ink composition for detection is directly applied on the floor surface. A guided body is loaded with a photo-detecting apparatus (for example, a photomultiplier which detects a visible light) which detects an emitted light from a floor surface, and an irradiation apparatus (an ultraviolet lamp).

A light is continuously irradiated from the irradiation apparatus, and the guided body travels with detecting an emitted light from a floor surface by the photo-detecting apparatus. When the emitted light from a floor surface is not detected, the advancing direction is altered and the guided body returns back into a range in which traveling is permitted.

(2) The molded resin for detection or the laminated article for detection of the present invention or a material on which the ink composition for detection of the present invention is applied is pasted on a floor surface, or the ink composition for detection is applied on a floor surface in linear condition along the traveling direction. A guided body is loaded with a photo-detecting apparatus (for example, a system which comprises a visible light detecting photo-multiplier and can detect a difference in incident light quantities between right and left each having ½ capacity) which detects an emitted light from a floor surface, and an irradiation apparatus (an ultraviolet lamp).

A light is continuously irradiated from the irradiation apparatus, and the guided body travels with detecting an emitted light from a floor surface by the photo-detecting apparatus. Then, traveling is controlled so that quantities of incident lights into the photo-multiplier are uniform between right and left. When there is a difference in light quantities between right and left, the advancing direction of the guided body is slightly directed to the direction of higher quantity. By this procedure, the traveling of the guided body is controlled along the line made of the molded resin for detection, the line made of the laminated article for detection or the applied trace of the ink composition for detection.

(3) The laminated article for detection of the present invention or a material on which the ink composition for detection of the present invention is applied is pasted on apart or whole surface of a wall, guardrail or obstacle, or the ink composition for detection is applied on them. An apparatus (for example, a system which comprises a visible light detecting photo-multiplier and can detect a difference in incident light quantities) which detects an emitted light from a floor surface and an irradiation apparatus (for example, an ultraviolet lamp) are loaded on the side surface of a guided body.

A light is continuously irradiated from the irradiation apparatus, and the guided body travels with detecting an emitted light from a wall surface by the photo-detecting apparatus. In this process, when the quantity of an incident light into the photo-multiplier reaches over a predetermined level, the advancing direction is changed or controlling is conducted for stop to avoid collision.

Next, synthesis examples of the compound represented by the general formula (2) which is the luminescent compound of the present invention will be described.

SYNTHESIS EXAMPLE 1

18 g of europium oxide, 80 g of 4,4,4-trifluoro-1-(2-thienyl)butane-1,3-dione and 30 g of tetrabutylammonium hydroxide were mixed and heated to obtain 100 g of a compound represented by the following formula (A):

(A)

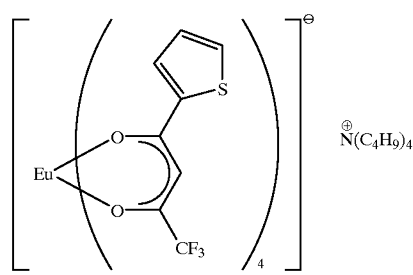

SYNTHESIS EXAMPLE 2

18 g of europium oxide, 88 g of 4,4,4-trifluoro-1-(2-tolyl) butane-1,3-dione and 30 g of tetrabutylammonium hydroxide were mixed and heated to obtain 102 g of a compound represented by the following formula (B):

(B)

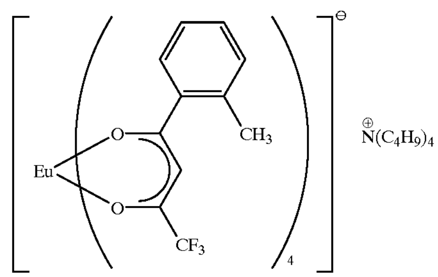

SYNTHESIS EXAMPLE 3

20 g of europium chloride, 90 g of 1,4-diphenylbutane-1,3-dione and 27 g of benzyltrimethylammonium hydroxide were mixed and heated to obtain 95 g of a compound represented by the following formula (C):

(C)

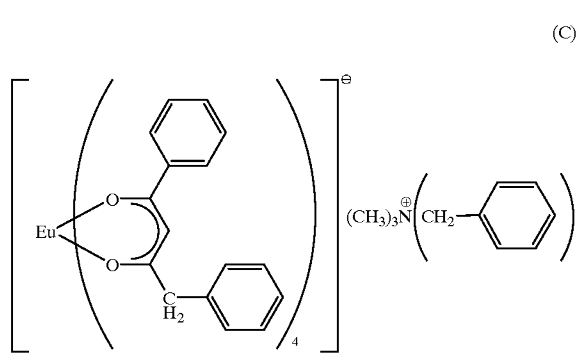

SYNTHESIS EXAMPLE 4

20 g of europium chloride, 100 g of 1-(2-benzothiazolyl)-5,5-bis(trifluoromethyl)pentane-1,3-dione and 30 g tetrabutylphosphonium hydroxide were mixed and heated to obtain 100 g of a compound represented by the following formula (D):

(D)

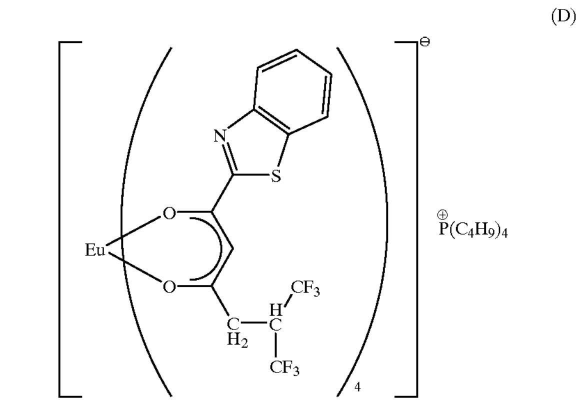

SYNTHESIS EXAMPLE 5

20 g of europium chloride, 100 g of 4,4,4-trifluoro-1-(2-naphthyl)butane-1,3-dione, 30 g of tetrabutylammonium chloride and 50 g of 20% aqueous sodium hydroxide were mixed and heated to obtain 100 g of a compound represented by the following formula (E):

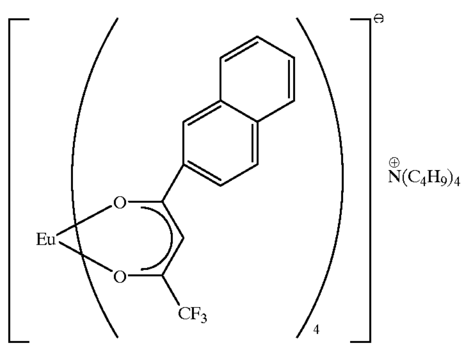

SYNTHESIS EXAMPLE 6

20 g of europium oxide, 100 g of 4,4,4-trifluoro-1-(2-triethylfuryl)butane-1,3-dione and 30 g of tetrabutylphosphonium hydroxide were mixed and heated to obtain 100 g of a compound represented by the following formula (F):

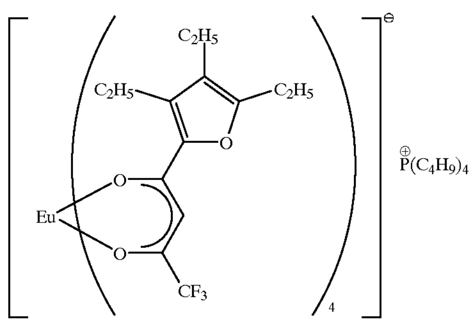

SYNTHESIS EXAMPLE 7

20 g of europium oxide, 100 g of 1-(2-benzoxazolyl)-5,5-bis (trifluoromethyl) pentane-1,3-dione and 30 g of tetrabutylphosphonium hydroxide were mixed and heated to obtain 100 g of a compound represented by the following formula (G):

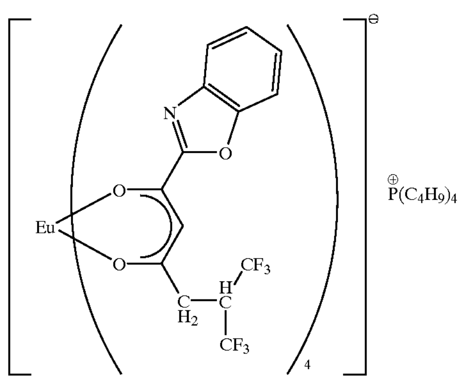

SYNTHESIS EXAMPLE 8

20 g of europium oxide, 100 g of 1-(phenyl)-2H,2H-tridecafluorononane-1,3-dione and 30 g of tetrabutylphosphonium hydroxide were mixed and heated to obtain 100 g of a compound represented by the following formula (H):

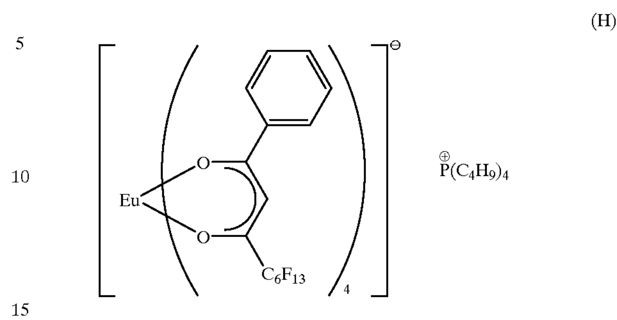

SYNTHESIS EXAMPLE 9

20 g of europium chloride, 90 g of 1,3-diphenylpropane-1,3-dione and 27 g of benzyltrimethylammonium hydroxide were mixed and heated to obtain 95 g of a compound represented by the following formula (I):

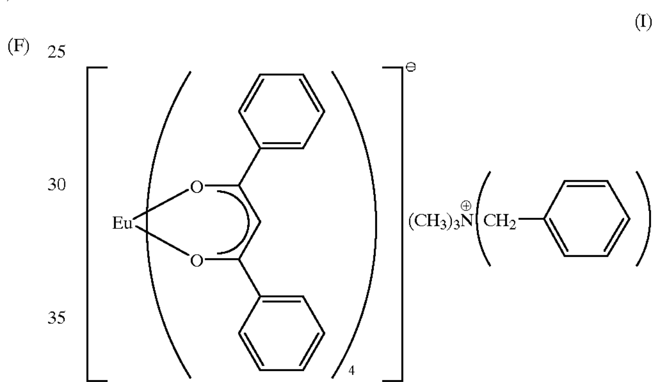

SYNTHESIS EXAMPLE 10

20 g of europium chloride, 100 g of 1-(2-benzothiazolyl)-4,4-bis(trifluoromethyl)butane-1,3-dione and 30 g of tetrabutylphosphonium hydroxide were mixed and heated to obtain 100 g of a compound represented by the following formula (J):

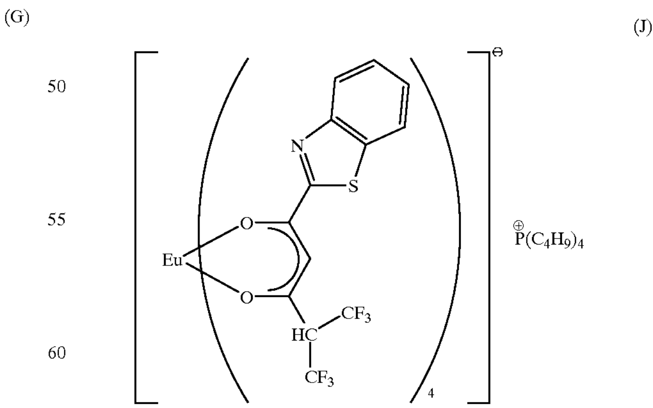

SYNTHESIS EXAMPLE 11

20 g of europium oxide, 100 g of 1-(phenyl)-2H,2H-1,3-dioxoperfluorododecane and 30 g of tetrabutylammonium hydroxide were mixed and heated to obtain 100 g of a compound represented by the following formula (K):

(K)

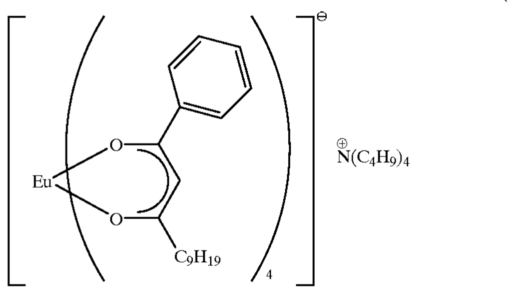

SYNTHESIS EXAMPLE 12

83 g of 4,4,4-trifluoro-1-phenylbutane-1,3-dione, 16.5 g of sodium hydroxide and 720 g of ethanol were mixed at a room temperature. 16.8 g of europium oxide was dissolved in 32 g of 35% hydrochloric acid, this solution was added dropwise to the mixture as obtained above, and 31 g of tetrabutylammonium bromide was further added and the resulting mixture was stirred for 1 hour at room temperature. This solution was poured into water and precipitates were filtered, washed with water, then dried to obtain 100 g of a compound represented by the following formula (L):

(L)

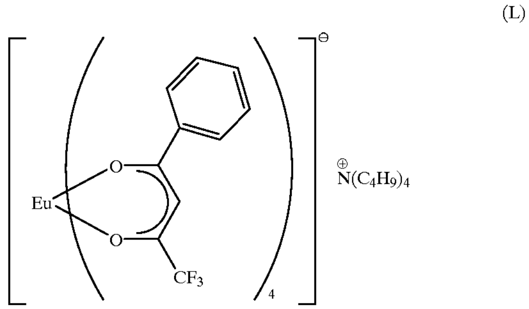

The detail of the present invention will be specifically described below. The measurements of an emission wavelength range and an exciting wavelength range were conducted using a FP-770-type fluorescent spectrophotometer manufactured by Nippon Bunko Kogyo K.K. The measurements of an emission wavelength range and an exciting wavelength range of a film sample were conducted further using an accessory, FP-1060-type solid sample measuring apparatus manufactured by Nippon Bunko Kogyo K.K. together.

Data regarding parameters A, B, b, Q and q in each example are summarized in Table 1, separately. Further, data regarding parameters A, B, b, Q and q in each comparative example are summarized in Table 2, separately.

EXAMPLE 1

100 g of the compound represented by formula (A) and 10 kg of high-density polyethylene resin pellets were mixed, and made into a film using a monoaxial extruder (ϕ30 mm; temperature: 230° C.; screw revolution speed: 80 rpm; line speed: 4 to 5 m/min; film thickness: 100 $\mu$m).

The emission and exciting wavelength ranges of this film were measured to find an emission wavelength range of 606 to 629 nm [A=606] and an exciting wavelength range of 263 to 383 nm [q=263, Q=383].

The film produced as described above was cut into a piece having a width of 100 cm, and adhesive was applied on one side of this piece, and the piece was pasted on a white floor surface in a lobby of a building. This floor surface kept white color, and maintained beautiful appearance.

Then, an automatic guided robot was made to travel on the film. This robot was made to travel with irradiating an ultraviolet ray having an irradiation wavelength range of 200 to 400 nm (b=200, B=400) onto the floor surface from an ultraviolet ray emission apparatus installed to the lower part of the robot and with detecting an emission light from the floor surface by a visible light detector installed to the lower part of the robot. And an operation system of the robot was controlled so that when the detector did not detect the emission light, the advancing direction was changed, and the robot returned back to a site at which the light could be detected. This system manifested no malfunction, and operated without failure.

EXAMPLE 2

100 g of the compound represented by formula (B) and 10 kg of polypropylene resin pellets (trade name "Norblene EFL560", manufactured by Mitsui Toatsu Chemicals, Inc.) were mixed, and made into a film using a monoaxial extruder (ϕ30 mm; temperature: 190° C.; screw revolution speed: 80 rpm; line speed: 4 to 5 m/min; film thickness: 100 $\mu$m).

The emission and exciting wavelength ranges of this film were measured to find an emission wavelength range of 604 to 627 nm [A=604] and an exciting wavelength range of 261 to 382 nm [q=261, Q=382].

The film produced as described above was cut into a piece having a width of 50 cm, an adhesive was applied on one side of this piece, and the piece was pasted on a floor surface. A robot loaded with half-split visible light detectors at right and left part of the lower portion of the robot and having an irradiation apparatus which emits an ultraviolet ray within an irradiation wavelength range of 200 to 400 nm [b=200, B=400] was made to travel on the film. The robot was made to travel with controlling so that light-intercepting quantities of the right and left detectors were equal. The system operated successfully without malfunction.

EXAMPLE 3

100 g of the compound represented by formula (C) and 10 kg of polypropylene resin pellets were mixed, and made into a film using a monoaxial extruder (ϕ30 mm; temperature: 190° C.; screw revolution speed: 80 rpm; line speed: 4 to 5 m/min; film thickness: 100 $\mu$m).

The emission and exciting wavelength ranges of this film were measured to find an emission wavelength range of 605 to 628 nm [A=605] and an exciting wavelength range of 262 to 380 nm [q=262, Q=380].

The film produced as described above was cut into apiece having a width of 50 cm, an adhesive was applied on one side of this piece, and the piece was pasted on a floor surface. A robot loaded with half-split visible light detectors at right and left part of the lower portion of the robot and having an irradiation apparatus which emits an ultraviolet ray within an irradiation wavelength range of 200 to 400nm [b=200, B=400] was made to travel on the film with controlling so that light-intercepting quantities of the right and left detectors were equal. The traveling was successful, and stable traveling was obtained even after one year.

EXAMPLE 4

100 g of the compound represented by formula (D) and 10 kg of polypropylene resin pellets were mixed, molten at 220° C., and a resin plate having a thickness of 5 mm was made using an injection molding machine.

The emission and exciting wavelength ranges of this plate were measured to find an emission wavelength range of 603 to 626 nm [A=603] and an exciting wavelength range of 260 to 382 nm [q=260, Q=382].

This plate was placed as a dividing wall of a room, the wall was irradiated with an ultraviolet ray having an irradiation wavelength range of 200 to 400 nm [b=200, B=400] from the side surface of the robot, and an emission light from the wall was detected by a visible light detector. Control was conducted so that when the robot came near the wall and the intercepting light quantity increased, the robot stopped, rotated and advanced to the different direction. By this control, the robot operated successfully without collision to the wall.

EXAMPLE 5

80 g of the compound represented by formula (E) and 10 kg of polyethylene terephthalate resin pellets were mixed, molten and mixed at 280° C., and a raw film having a thickness of 500 $\mu$m was made by an extruder. Then, the raw film was heated at 85° C., and stretched to 3-fold length.

The emission and exciting wavelength ranges of this film were measured to find an emission wavelength range of 609 to 631 nm [A=609] and an exciting wavelength range of 266 to 385 nm [q=266, Q=385].

The film produced as described above was cut into a piece having a width of 50 cm, an adhesive was applied on one side of this piece, and the piece was pasted on a floor surface. A robot was loaded with half-split visible light detectors and an irradiation apparatus which emits an ultraviolet ray within an irradiation wavelength range of 200 to 400 nm [b=200, B=400] at the lower part, and the robot was made to travel on the film with controlling so that light-intercepting quantities of the right and left detectors were equal. The traveling was successful without malfunction.

EXAMPLE 6

100 g of the compound represented by formula (F) and 10 kg of polyethylene terephthalate resin pellets were mixed, molten with heating at 260° C., and was extruded to obtain a film having a thickness of 1 mm.

The emission and exciting wavelength ranges of this film were measured to find an emission wavelength range of 608 to 631 nm [A=608] and an exciting wavelength range of 265 to 383 nm [q=265, Q=383].

The film produced as described above was cut into a piece having a width of 50 cm, an adhesive was applied on one side of this piece, and the piece was pasted on a floor surface. A robot was loaded with half-split visible light detectors and an irradiation apparatus which emits an ultraviolet ray within an irradiation wavelength range of 200 to 400 nm [b=200, B=400] at the lower part, and the robot was made to travel on the film with controlling so that light-intercepting quantities of the right and left detectors were equal. The robot traveled successfully without malfunction.

EXAMPLE 7

300 g of the compound represented by formula (G) and 10 kg of polymethyl acrylate resin pellets were mixed, molten at 260° C., and was extruded to obtain a plate having a thickness of 3 mm.

The emission and exciting wavelength ranges of this plate were measured to find an emission wavelength range of 606 to 629 nm [A=606] and an exciting wavelength range of 263 to 383 nm [q=263, Q=383].

An adhesive was applied on one side of this plate, and this plate was attached to a guardrail and the guardrail was place on a path. An ultraviolet ray irradiation apparatus having an irradiation wavelength range of 200 to 400 nm [b=200, B=400] and a visible light emitting apparatus were installed on the side surface of an automobile.

The system was set so that the automobile run along the guardrail in night, an ultraviolet ray was irradiated from the side surface of the automobile toward the guardrail, and when the automobile came near the guardrail within 1 meter from the rail, a warning equipment installed on the automobile gave a warning depending on the strength of a red light emitted from the guardrail.

EXAMPLE 8

100 g of the compound represented by formula (H) and 10 kg of polypropylene resin pellets were mixed, molten with heating at 210° C., and was extruded by a monoaxial extruder to make a film having a thickness of 500 $\mu$m, then the film was stretched to 3-fold length at 85° C.

The emission and exciting wavelength ranges of this film were measured to find an emission wavelength range of 608 to 631 nm [A=608] and an exciting wavelength range of 263 to 384 nm [q=263, Q=384].

The film produced as described above was cut into a piece having a width of 50 cm, an adhesive was applied on one side of this piece, and the piece was pasted on a floor surface. A robot was loaded with half-split visible light detectors and an irradiation apparatus which emits an ultraviolet ray within an irradiation wavelength range of 200 to 400 nm [b=200, B=400] at the lower part, and the robot traveled on the film with controlling so that light-intercepting quantities of the right and left detectors were equal. The robot traveled successfully without malfunction.

EXAMPLE 9

50 g of the compound represented by formula (A), 1 kg of "Saibinol AT-D40" (trade name, ethyl acetate solution of acrylic polymer; manufactured by Saiden Kagaku K.K.) and 10 g of a curing agent M-2 (manufactured by Saiden Kagaku K.K.) were mixed, and the mixture was applied on a polypropylene film (thickness 50 $\mu$m; width 1 m) to prepare a film for detection.

The emission and exciting wavelength ranges of this film were measured to find an emission wavelength range of 606 to 629 nm [A=606] and an exciting wavelength range of 263 to 383 nm [q=263, Q=383].

The film produced as described above was pasted on a road, and a robot was made to run on this road. This robot was made to travel with irradiating an ultraviolet ray having a irradiation wavelength range of 250 to 400 nm (b=250, B=400) onto the road surface from an ultraviolet ray emission apparatus of the robot with detecting an emission light from the road surface by a visible light detector installed to the lower part of the robot. And an operation system of the robot was controlled so that when the detector did not detect the emission light, the advancing direction was changed, and the robot returned back to a site at which the light could be detected. This system manifested no malfunction, and operated without failure.

EXAMPLE 10

100 g of the compound represented by formula (B), 1 kg of "SK Dine 1330" (trade name, toluene/ethyl acetate mixed solution of two-part crosslinking type acrylic resin; manufactured by Soken Kagaku K.K.) and 12 g of a curing agent M-5A (manufactured by Soken Kagaku K.K.) were mixed, and the mixture was applied by a coating machine on the back surface of a polyethylene film (thickness 25 μm, width 50 cm) to obtain a thickness of 80 μm, and dried with hot air at 50° C.

The emission and exciting wavelength ranges of this film were measured to find an emission wavelength range of 604 to 627 nm [A=604] and an exciting wavelength range of 261 to 382 nm [q=261, Q=382].

The film produced as described above was pasted on a floor surface. A robot was loaded with half-split visible light detectors and an irradiation apparatus which emits an ultraviolet ray within an irradiation wavelength range of 200 to 400 nm [b=200, B=400], and the robot was made to travel on the film with controlling so that light-intercepting quantities of the right and left detectors were equal. The robot operated successfully without malfunction.

EXAMPLE 11

100 g of the compound represented by formula (I), 1 kg of "SK Dine 700" (trade name, toluene/ethyl acetate mixed solution of two-part crosslinking type acrylic resin; manufactured by Soken Kagaku K.K.) and 12 g of a curing agent M-5A (manufactured by Soken Kagaku K.K.) were mixed, and the mixture was applied by a coating machine on the back surface of a polyvinyl chloride film (thickness 200 μm, width 50 cm) to obtain a thickness of 80 μm, and dried with hot air at 50° C.

The emission and exciting wavelength ranges of this film were measured to find an emission wavelength range of 607 to 630 nm [A=607] and an exciting wavelength range of 264 to 385 nm [q=264, Q=385].

The film produced as described above was pasted on a floor surface. A robot was loaded with half-split visible light detectors and an irradiation apparatus which emits an ultraviolet ray within an irradiation wavelength range of 200 to 400 nm [b=200, B=400] at the lower part of the robot, and the robot was made to travel on the film with controlling so that light-intercepting quantities of the right and left detectors were equal. The robot traveled successfully, and stable traveling is obtained even after one year.

EXAMPLE 12

100 g of the compound represented by formula (J) and 1 kg of "SK Dine 1604S" (trade name, toluene/ethyl acetate/isopropanol mixed solution of one-part type acrylic adhesive; manufactured by Soken Kagaku K.K.) were mixed, and the mixture was applied by a coating machine on the back surface of a polymethyl methacrylate film (thickness 50 μm, width 50 cm) to obtain a thickness of 80 μm, and dried with hot air at 50° C.

The emission and exciting wavelength ranges of this film were measured to find an emission wavelength range of 606 to 631 nm [A=606] and an exciting wavelength range of 264 to 385 nm [q=264, Q=385].

The film produced as described above was pasted on a floor surface. A robot was loaded with half-split visible light detectors and an irradiation apparatus which emits an ultraviolet ray within an irradiation wavelength range of 200 to 400 nm [b=200, B=400], and the robot was made to travel on the film with controlling so that light-intercepting quantities of the right and left detectors were equal. The robot traveled successfully, and stable traveling is obtained even after one year.

EXAMPLE 13

80 g of the compound represented by formula (E) and 1 kg of "SK Dine 1022" (trade name, toluene/ethyl acetate/isopropanol mixed solution of one-part type acrylic adhesive; manufactured by Soken Kagaku K.K.) were mixed, and the mixture was applied by a coating machine on the back surface of a polymethyl methacrylate film (thickness 50 μm, width 50 cm) to obtain a thickness of 80 μm, and dried with hot air at 50° C.

The emission and exciting wavelength ranges of this film were measured to find an emission wavelength range of 609 to 631 nm [A=609] and an exciting wavelength range of 266 to 385 nm [q=266, Q=385].

The film was installed on a wall. An ultraviolet ray within an irradiation wavelength range of 200 to 400 nm [b=200, B=400] was irradiated from the side surface of the robot toward the wall, and an emission light from the wall was detected by a visible light detecting sensor installed on the side surface of the robot. Control was conducted so that when the robot came near the wall and a light-intercepting quantity increased, the robot stopped, rotated, and advanced to other direction. By this control, the robot operated successfully without collision to the wall.

EXAMPLE 14

100 g of the compound represented by formula (F), 1 kg of "Saibinol AT-D40" (trade name, ethyl acetate solution of acrylic polymer; manufactured by Saiden Kagaku K.K.) and 10 g of a curing agent M-2 (manufactured by Saiden Kagaku K.K.) were mixed, and the mixture was applied with a coating machine on the back surface of a polycarbonate plate (thickness 2 mm; width 10 cm; length 10 m) to obtain a thickness of 80 μm, and dried with air at 50° C.

The emission and exciting wavelength ranges of this film were measured to find an emission wavelength range of 608 to 631 nm [A=608] and an exciting wavelength range of 265 to 383 nm [q=265, Q=383].

The film produced as described above was pasted on a floor. A robot was loaded with an irradiation apparatus which emits an ultraviolet ray within an irradiation wavelength range of 200 to 400 nm [b=200, B=400] and a visible light detector at the lower part of the robot, and the robot was made to run on the film with detecting an emission obtained by an ultraviolet ray irradiation by the visible light detector. The robot could travel successfully.

EXAMPLE 15

300 g of the compound represented by formula (G), 1 kg of "Saibinol AT-D40" (trade name, ethyl acetate solution of acrylic polymer; manufactured by Saiden Kagaku K.K.) and 10 g of a curing agent M-2 (manufactured by Saiden Kagaku K.K.) were mixed, and the mixture was applied with a coating machine on the back surface of a polymethyl acrylate film (thickness 50 μm; width 10 cm; length 10 m) to obtain a thickness of 80 μm, and dried with air at 50° C.

The emission and exciting wavelength ranges of this film were measured to find an emission wavelength range of 606 to 629 nm [A=606] and an exciting wavelength range of 263 to 383 nm [q=263, Q=383].

The film produced as described above was attached to a guardrail and the guardrail was placed on a road. An ultraviolet ray irradiation apparatus having an irradiation wavelength range of 200 to 400 nm [b=200, B=400] and a visible light detector were installed on the side surface of an automobile.

The automobile was made to run along the guardrail. This guardrail received an ultraviolet ray from the ultraviolet ray irradiation apparatus loaded on the automobile and emitted a red light. The system was set so that when the automobile came near the guardrail within 1 m from the rail, the automobile gave a warning using the visible light detector installed on the automobile. Due to this control, the automobile could travel safely.

EXAMPLE 16

100 g of the compound represented by formula (K), 1 kg of "Saibinol AT-D40" (trade name, ethyl acetate solution of acrylic polymer; manufactured by Saiden Kagaku K.K.) and 10 g of a curing agent M-2 (manufactured by Saiden Kagaku K.K.) were mixed, and the mixture was applied with a coating machine on the back surface of a polyether ether ketone film (thickness 50 μm; width 10 cm; length 10 m) to obtain a thickness of 80 μm, and dried with air at 50° C.

The emission and exciting wavelength ranges of this film were measured to find an emission wavelength range of 605 to 628 nm [A=605] and an exciting wavelength range of 261 to 380 nm [q=261, Q=380].

The film produced as described above was pasted on a wall. A robot was loaded with an ultraviolet ray irradiation apparatus which emits an ultraviolet ray within an irradiation wavelength range of 200 to 400 nm [b=200, B=400] and a visible light detector at the side surface, and the robot was made to travel along the wall with irradiating an ultraviolet ray toward the wall. The collision of the robot could be prevented by having a photoelectron control system so that when the robot came near the wall within 1 meter from the wall, the robot was made to stop.

EXAMPLE 17

32 g of the compound represented by formula (A), 4000 g of ethylene glycol monoethyl ether and 16 g of "Delpet 60N" (trade name, copolymer resin of methyl methacrylate and methyl acrylate; manufactured by Asahi Chemical Industry Co., Ltd.) were mixed, kept at a temperature of 60° C. to complete dissolution, then returned to room temperature, to prepare an ink composition of Example 17.

The emission and exciting wavelength ranges of this ink composition were measured to find an emission wavelength range of 606 to 629 nm [A=606] and an exciting wavelength range of 263 to 383 nm [q=263, Q=383].

The ink composition was applied on a road and dried to make a guiding road having a width of 250 cm, and a robot was made to travel on this road. The robot was loaded with an irradiation apparatus which emits an ultraviolet-blue beam within an irradiation wavelength range of 250 to 450 nm [b=250, B=450] and a visible light detector at the lower part of the robot, and this robot was made to travel with irradiating an ultraviolet ray toward the ground and with detecting an emission light from the guiding road. An operation system of the robot was controlled so that when the detector did not detect the emission light, the advancing direction was changed, and the robot returned back to a site at which the light could be detected. This system manifested no malfunction, and operated without failure.

EXAMPLE 18

64 g of the compound represented by formula (B), 4000 g of ethylene glycol monomethyl ether and 32 g of "Delpet 60N" (trade name, copolymer resin of methyl methacrylate and methyl acrylate; manufactured by Asahi Chemical Industry Co., Ltd.) were mixed, kept at a temperature of 60° C. to complete dissolution, then returned to room temperature, to prepare an ink composition of Example 18.

The emission and exciting wavelength ranges of this ink composition were measured to find an emission wavelength range of 604 to 627 nm [A=604] and an exciting wavelength range of 261 to 382 nm [q=261, Q=382].

The ink composition prepared as described above was applied on a floor surface and dried to make a guiding road having a width of 50 cm. A robot was loaded with half-split visible light detectors and an irradiation apparatus which emits an ultraviolet ray within an irradiation wavelength range of 200 to 400 nm [b=200, B=400], and the robot was made to travel on the guiding road with controlling so that light-intercepting quantities of the right and left detectors were equal. The system operated successfully without malfunction.

EXAMPLE 19

48 g of the compound represented by formula (C), 4000 g of ethylene glycol monopropylethyl ether and 24 g of "Delpowder 60N" (trade name, copolymer resin of methyl methacrylate and methyl acrylate; manufactured by Asahi Chemical Industry Co., Ltd.) were mixed, kept at a temperature of 60° C. to complete dissolution, then returned to room temperature, to prepare an ink composition of Example 19.

The emission and exciting wavelength ranges of this ink composition were measured to find an emission wavelength range of 605 to 628 nm [A=605] and an exciting wavelength range of 262 to 380 nm [q=262, Q=380].

The ink composition prepared as described above was applied on a floor surface and dried to make a guiding road. A robot was loaded with half-split visible light detectors and an irradiation apparatus which emits an ultraviolet ray within an irradiation wavelength range of 200 to 400nm [b=200, B=400] at the lower part of the robot, and the robot was made to travel on the guiding road with controlling so that light-intercepting quantities of the right and left detectors were equal. The robot traveled successfully, and stable traveling was obtained even after one year.

EXAMPLE 20

100 g of the compound represented by formula (L), 30 kg of ethylene glycol diethyl ether and 100 g of "Delpowder 60N" (trade name, copolymer resin of methyl methacrylate and methyl acrylate; manufactured by Asahi Chemical Industry Co., Ltd.) were mixed, kept at a temperature of 60° C. to complete dissolution, then returned to room temperature, to prepare an ink composition of Example 20.

The emission and exciting wavelength ranges of this ink composition were measured to find an emission wavelength range of 607 to 630 nm [A=607] and an exciting wavelength range of 262 to 382 nm [q=262, Q=382].

This ink composition was applied on a guardrail and dried and the guardrail was place on a road. An ultraviolet ray irradiation apparatus having an irradiation wavelength range of 200 to 400 nm [b=200, B=400] and a visible light detector were installed on the side surface of an automobile. The automobile was made to run along the guardrail at night. The system was set so that an ultraviolet ray was irradiated from the side surface of the automobile toward the guardrail, and when the automobile came near the guardrail within 1 meter from the rail, a warning equipment attached to the automobile gave a warning depending on the strength of a red emission light from the guardrail. Due to this control, the automobile could travel safely.

EXAMPLE 21

100 g of the compound represented by formula (A) and 10 kg of high-density polyethylene resin pellets were mixed, and made into a film using a monoaxial extruder (ϕ30 mm; temperature: 230° C.; screw revolution speed: 80 rpm; line speed: 4 to 5 m/min; film thickness: 100 μm). An adhesive was applied on the back surface of the film produced as described above.

The emission and exciting wavelength ranges of this film were measured to find an emission wavelength range of 606 to 629 nm [A=606] and an exciting wavelength range of 263 to 383 nm [q=263, Q=383].

The film was cut into a piece having a width of 250 cm, and this piece was pasted on a road, and a robot was made to run on this road. This robot was loaded with an irradiation apparatus which emits an ultraviolet ray having a irradiation wavelength range of 300 to 400 nm [b=300, B=400] and a visible light detector, and the robot was made to travel on the film with irradiating an ultraviolet ray toward the ground and with detecting an emission light from the film. The system was controlled so that when the detector did not detect the emission light, the advancing direction was changed, and the robot returned back to a site at which the light could be detected. This system manifested no malfunction, and operated without failure.

EXAMPLE 22

100 g of the compound represented by formula (L) and 10 kg of high-density polyethylene resin pellets were mixed, and made into a film using a monoaxial extruder (ϕ30 mm; temperature: 230° C.; screw revolution speed: 80 rpm; line speed: 4 to 5 m/min; film thickness: 100 μm). An adhesive was applied on the back surface of the film produced as described above.

The emission and exciting wavelength ranges of this film were measured to find an emission wavelength range of 607 to 630 nm [A=607] and an exciting wavelength range of 262 to 382 nm [q=262, Q=382].

The film was cut into a piece having a width of 100 cm, pasted on a white floor surface in a lobby of a building, and a robot was made to travel on this film. This floor surface kept white color, and maintained beautiful appearance.

Then, the robot was made to travel with irradiating an ultraviolet-blue beam within an irradiation wavelength range of 250 to 450 nm [b=250, B=450] toward the ground from an ultraviolet ray irradiation apparatus installed at the lower part of the robot and with detecting the resulting emission with a visible light detector installed at the lower part of the robot. An operation system was controlled so that when the detector did not detect the emission light, the advancing direction was changed, and the robot returned back to a site at which the light could be detected. This system manifested no malfunction, and operated without failure.

COMPARATIVE EXAMPLE 1

Mixing with 10 kg of high-density polyethylene resin pellets was conducted in the same manner as in Example 1 except that 100 g of EG-302 a perylene type dye (manufactured by Mitsui Toatsu Chemicals Inc.) was used instead of compound (A) in Example 1, and the mixture was made into a film using a monoaxial extruder (ϕ30 mm; temperature: 230° C.; screw revolution speed: 80 rpm; line speed: 4 to 5 m/min; film thickness: 100 μm). And an adhesive was applied on the back surface of the resulting film to prepare a laminated article for detection of Comparative Example 1.

The emission and exciting wavelength ranges of this film were measured to find an emission wavelength range of 473 to 596 nm [A=473] and an exciting wavelength range of 384 to 519 nm [q=384, Q=519].

The film produced as described above was cut into a piece having a width of 100 cm, and the piece was pasted on a white floor surface in a lobby of a building. This floor surface revealed yellow color, and poorly evaluated by strangers.

Then, the robot was made to travel along the film with irradiating an ultraviolet ray within an irradiation wavelength range of 200 to 400 nm [b=200, B=400] toward the ground from an ultraviolet ray irradiation apparatus installed at the lower part of the robot and with detecting the resulting visible emission with a visible light detector installed at the lower part of the robot. The emission was weak since the exciting energy was low, and further, a reflected light of the irradiation light was produced, therefore, the detector malfunctioned and the robot deviated from the film guiding road.

COMPARATIVE EXAMPLE 2

Mixing with 30 kg of ethylene glycol diethyl ether and 100 g of "Delpowder 60N" (trade name, copolymer resin of methyl methacrylate and methyl acrylate; manufactured by Asahi Chemical Industry Co., Ltd.) was conducted except that 100 g of EB-501 a coumarin type dye (manufactured by Mitsui Toatsu Chemicals Inc.) was used instead of 100 g of compound (L) in Example 20, and the mixture was kept at a temperature of 60° C. to complete dissolution, then returned to room temperature, to prepare an ink composition for detection of Comparative Example 2.

The emission and exciting wavelength ranges of this ink composition were measured to find an emission wavelength range of 395 to 522 nm [A=395] and an exciting wavelength range of 324 to 416 nm [q=324, Q=416].

This ink composition was applied on a guardrail and dried and the guardrail was place on a road. An ultraviolet ray irradiation apparatus having an irradiation wavelength range of 200 to 400 nm [b=200, B=400] and a visible light detector were installed on the side surface of an automobile.

The automobile was made to run along the guardrail at night. The system was set so that an ultraviolet ray was irradiated from the side surface of the automobile toward the guardrail, and when the automobile came near the guardrail within 1 meter from the rail, a warning equipment attached to the automobile gave a warning. However, since the ultraviolet irradiation ray from the automobile was reflected by the guardrail and the reflected light was caught by the detector, correct distance could not be recognized, the warning was given before the automobile came near within 1 m from the guardrail, and therefore, the system control was not conducted successfully.

In the following tables, used dyes and each value of parameters b, B, q, Q and A in Examples 1 to 22 and Comparative Examples 1 to 2 are shown.

Mark "O" is imparted to an example which suffices the formula:

$$A-B \geqq 150 \text{ nm} \quad (1).$$

prescribed in the present invention, and mark "x" is imparted to an example which does no suffice the formula.

Further, regarding traveling controlling, an example which could surely conduct controlling is evaluated as excellent, and an example which caused malfunction is evaluated as impossible.

As is evident from Table 1, Examples 1 to 22 show the methods for controlling traveling of the present invention using the luminescent compounds of the present invention. In these methods, travel controlling could be surely conducted without malfunction. On the other hand, as is evident from Table 2, in the methods for controlling traveling of Comparative Examples 1 to 2, malfunction occurred and automatic travel controlling could not be conducted.

The luminescent compound for controlling traveling of the present invention is an excellent compound which can carry out a method for automatically controlling traveling surely without malfunction.

Further, the molded resin for detection, the laminated article for detection and the ink composition of the present invention can easily be installed to a desired place optionally such as a floor, wall, and can easily be removed, therefore, they can be applied for various layouts instantly, can be installed at low cost and manifests excellent characteristics.

Further, when the compound represented by formula (2) which is described as one example of the dye of the present invention is installed on a guide path as a laminated article for detection or an ink composition for detection, it manifests red color efficiently on being irradiated with an ultraviolet ray, however, it is colorless on being irradiated with a normal visible light, therefore, the compound is an advantageous material for interior decoration.

It is to be understood, however, that although the characteristics and advantages of the present invention have been set forth in the foregoing description, the disclosure is illustrative only, and changes may be made in the arrangement of the parts within the scope of the appended claims.

TABLE 1

(Results for Examples)

| Ex | Used dye | b | B | q | Q | A | Calcd. value A-B | Parameter evaluation A-B ≧ 150 | Traveling controlling |
|---|---|---|---|---|---|---|---|---|---|
| 1 | A | 200 | 400 | 263 | 383 | 606 | 206 | ○ | excellent |
| 2 | B | 200 | 400 | 261 | 382 | 604 | 204 | ○ | excellent |
| 3 | C | 200 | 400 | 262 | 380 | 605 | 205 | ○ | excellent |
| 4 | D | 200 | 400 | 260 | 382 | 603 | 203 | ○ | excellent |
| 5 | E | 200 | 400 | 266 | 385 | 609 | 209 | ○ | excellent |
| 6 | F | 200 | 400 | 265 | 383 | 608 | 208 | ○ | excellent |
| 7 | G | 200 | 400 | 263 | 383 | 606 | 206 | ○ | excellent |
| 8 | H | 200 | 400 | 263 | 384 | 608 | 208 | ○ | excellent |
| 9 | A | 250 | 400 | 263 | 383 | 606 | 206 | ○ | excellent |
| 10 | B | 200 | 400 | 261 | 382 | 604 | 204 | ○ | excellent |
| 11 | I | 200 | 400 | 264 | 385 | 607 | 207 | ○ | excellent |
| 12 | J | 200 | 400 | 263 | 385 | 606 | 206 | ○ | excellent |
| 13 | E | 200 | 400 | 266 | 385 | 609 | 209 | ○ | excellent |
| 14 | F | 200 | 400 | 265 | 383 | 608 | 208 | ○ | excellent |
| 15 | G | 200 | 400 | 263 | 383 | 606 | 206 | ○ | excellent |
| 16 | K | 200 | 400 | 261 | 380 | 605 | 205 | ○ | excellent |
| 17 | A | 250 | 450 | 263 | 383 | 606 | 156 | ○ | excellent |
| 18 | B | 200 | 400 | 261 | 382 | 604 | 204 | ○ | excellent |
| 19 | C | 200 | 400 | 262 | 380 | 605 | 205 | ○ | excellent |
| 20 | L | 200 | 400 | 262 | 382 | 607 | 207 | ○ | excellent |
| 21 | A | 300 | 400 | 263 | 383 | 606 | 256 | ○ | excellent |
| 22 | L | 250 | 450 | 262 | 382 | 607 | 157 | ○ | excellent |

TABLE 2

(Results for Comparative Examples)

| Comp. Ex. | Used dye | Parameter b | B | q | Q | A | Calcd. value A-B | Parameter evaluation A-B ≧ 150 | Traveling controlling |
|---|---|---|---|---|---|---|---|---|---|
| 1 | EG302 | 200 | 400 | 384 | 519 | 473 | 73 | X | impossible |
| 2 | EB501 | 200 | 400 | 324 | 416 | 395 | −5 | X | impossible |

What is claimed is:

1. An optically controlled traveling system, a source of light and a traveling vehicle wherein the system comprises a film on a surface and the traveling vehicle is provided with a detector which controls the direction of travel of the traveling vehicle by detecting emitted light from the film which originates from the source of light wherein the film comprises a luminescent compound which has a minimum luminescent wavelength end (A nm) and an irradiation light source which emits a light having a maximum irradiation wavelength end (B nm), wherein the minimum luminescent wavelength end A is defined as a wavelength which has a strength which is one-twentieth of the maximum luminescence energy strength, the maximum irradiation wavelength end B is defined as a wavelength which has a strength which is one-fifth of the maximum irradiation light energy strength and the difference between A and B satisfies the following formula (1):

$$A-B \geqq 150 \text{ nm} \quad (1)$$

wherein the luminescent compound is used in a resin composition with a resin and the resin composition in the form of a film is used as a molded resin material which is obtained by molding thereof.

2. The optically controlled traveling system according to claim 1, wherein the molded resin material has a thickness from 10 to 500 μm.

3. The optically controlled traveling system according to claim 1, wherein the luminescent compound is present as a layered article comprising the molded resin material and an adhesive layer.

4. An optically controlled traveling system, a source of light and a traveling vehicle wherein the system comprises a film on a surface and the traveling vehicle is provided with a detector which controls the direction of travel of the traveling vehicle by detecting emitted light from the film which originates from the source of light wherein the film comprises a luminescent compound which has a minimum luminescent wavelength end (A nm) and an irradiation light source which emits a light having a maximum irradiation wavelength end (B nm), wherein the minimum luminescent wavelength end A is defined as a wavelength which has a strength which is one-twentieth of the maximum luminescence energy strength, the maximum irradiation wavelength end B is defined as a wavelength which has a strength which is one-fifth of the maximum irradiation light energy strength and the difference between A and B satisfies the following formula (1):

$$A-B \geqq 150 \text{ nm} \quad (1)$$

wherein the luminescent compound of said film is present as a laminated article which is obtained by applying on a resin film an adhesive containing the luminescent compound.

5. The optically controlled traveling system according to claim 4, wherein the resin film is selected from polyethylene, polypropylene, polyvinyl chloride, polyvinylidene chloride, polystyrene, polyethylene terephthalate, polycarbonate, polymethyl acrylate, polymethyl methacrylate, polyether ether ketone and polyether sulfone.

6. The optically controlled traveling system according to claim 4, wherein the luminescent compound of said film is represented by the general formula (2):

(2)

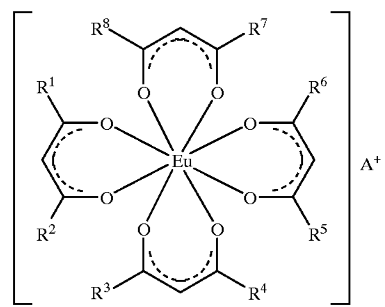

wherein, $R^1$, $R^2$, $R^3$, $R^4$, $R^5$, $R^6$, $R^7$ and $R^8$ each independently represents a substituted or unsubstituted alkyl group, a substituted or unsubstituted aryl group or a substituted or unsubstituted heteroaryl group, and $A^+$ represents a quaternary ammonium ion or phosphonium ion.

7. The optically controlled traveling system according to claim 4, wherein the thickness of the resin film is from 5 to 500 μm.

8. The optically controlled traveling system according to claim 4, wherein the luminescent compound of said film is contained in an amount from 0.01% by weight to 10% by weight based on the adhesive.

9. The optically controlled traveling system according to claim 4, wherein the adhesive is an acrylic adhesive.

10. An optically controlled traveling system, a source of light and a traveling vehicle wherein the system comprises a film on a surface and the traveling vehicle is provided with a detector which controls the direction of travel of the traveling vehicle by detecting emitted light from the film which originates from the source of light wherein the film comprises a luminescent compound which has a minimum luminescent wavelength end (A nm) and an irradiation light source which emits a light having a maximum irradiation wavelength end (B nm), wherein the minimum luminescent wavelength end A is defined as a wavelength which has a strength which is one-twentieth of the maximum luminescence energy strength, the maximum irradiation wavelength end B is defined as a wavelength which has a strength which is one-fifth of the maximum irradiation light energy strength and the difference between A and B satisfies the following formula (1):

$$A-B \geqq 150 \text{ nm} \quad (1)$$

wherein the luminescent compound of said film is present as an ink composition which comprises the luminescent compound, a solvent and a binder and wherein the binder is polymethyl methacrylate, polymethyl acrylate, or a copolymer resin of methyl methacrylate and methyl acrylate.

11. A method for optically controlling a traveling article, wherein a traveling controlling ink composition containing a luminescent compound dissolved in a solvent or binder is placed in a range in which traveling is permitted and the traveling article equipped with a photo-detecting apparatus and an irradiation light source is provided, said method comprising providing light from the irradiation light source and controlling the travel of the traveling article by detecting emitted light from the traveling controlling composition due to excitation of the luminescent compound, with the proviso that the luminescent compound has a minimum luminescent wavelength end (A) and the irradiation light source can emit a light having a maximum irradiation wavelength end (B), wherein the minimum luminescent wavelength end A is defined as a wavelength which has a strength which is one-twentieth of the maximum luminescence energy strength, the maximum irradiation wavelength end B is defined as a wavelength which has a strength which is one-fifth of the maximum irradiation light energy strength and the difference between A and B satisfies the following formula (1):

$$A-B \geqq 150 \text{ nm} \tag{1}$$

12. The method for controlling traveling according to claim 11, wherein the luminescent compound is represented by the general formula (2):

(2)

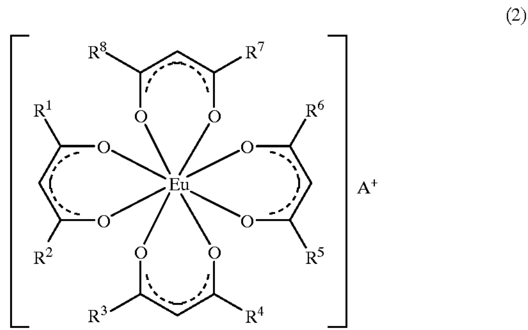

wherein, $R^1$, $R^2$, $R^3$, $R^4$, $R^5$, $R^6$, $R^7$ and $R^8$ each independently represents a substituted or unsubstituted alkyl group, a substituted or unsubstituted aryl group or a substituted or unsubstituted heteroaryl group, and $A^+$ represents a quaternary ammonium ion or phosphonium ion.

* * * * *